(12) United States Patent
Xu et al.

(10) Patent No.: US 11,317,249 B2
(45) Date of Patent: Apr. 26, 2022

(54) APPARATUSES AND METHODS TO SUPPORT LOCAL MULTIMEDIA BROADCAST MULTICAST SERVICE (MBMS) DISTRIBUTION

(71) Applicant: NOKIA SOLUTIONS AND NETWORKS OY, Espoo (FI)

(72) Inventors: Xiang Xu, Nanjing (CN); David Navratil, Helsinki (FI); Curt Wong, Bellevue, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 556 days.

(21) Appl. No.: 16/089,620

(22) PCT Filed: Mar. 31, 2016

(86) PCT No.: PCT/US2016/025203
§ 371 (c)(1),
(2) Date: Sep. 28, 2018

(87) PCT Pub. No.: WO2017/171784
PCT Pub. Date: Oct. 5, 2017

(65) Prior Publication Data
US 2020/0304958 A1    Sep. 24, 2020

(51) Int. Cl.
*H04W 4/06* (2009.01)
*H04W 76/40* (2018.01)
(Continued)

(52) U.S. Cl.
CPC ............. *H04W 4/06* (2013.01); *H04W 12/03* (2021.01); *H04W 12/106* (2021.01); *H04W 76/40* (2018.02)

(58) Field of Classification Search
CPC ....... H04W 4/06; H04W 76/40; H04W 76/12; H04W 12/106; H04W 12/03; H04L 65/4076; H04L 29/06455; H04N 21/6405
See application file for complete search history.

(56) References Cited

U.S. PATENT DOCUMENTS

2006/0072534 A1    4/2006   Jokinen et al.
2007/0014291 A1    1/2007   Zhang
(Continued)

FOREIGN PATENT DOCUMENTS

CN    101056249 A    10/2007
CN    101094457 A    12/2007
(Continued)

OTHER PUBLICATIONS

International Search Report and Written Opinion dated Jul. 12, 2016, issued in corresponding PCT International Application No. PCT/US2016/025203.
(Continued)

*Primary Examiner* — Quoc Thai N Vu
(74) *Attorney, Agent, or Firm* — Squire Patton Boggs (US) LLP

(57) ABSTRACT

Systems, methods, apparatuses, and computer program products for supporting local MBMS distribution are provided. One method includes receiving, by a broadcast multicast service center (BM-SC), an activate multimedia broadcast multicast service (MBMS) bearer request message to initiate an activate multimedia broadcast multicast service (MBMS) bearer request procedure. The activate MBMS bearer request message comprises at least one of information on local MBMS distribution received from a local MBMS entity (LME), or a destination area, or a destination area and an indication that preferred delivery is via local distribution. The method may further include determining whether local distribution path will be used based on at least one of
(Continued)

information received in the activate MBMS bearer request message, or stored information about local MBMS entities.

10 Claims, 8 Drawing Sheets

(51) Int. Cl.
*H04W 12/03* (2021.01)
*H04W 12/106* (2021.01)

(56) References Cited

U.S. PATENT DOCUMENTS

| | | | |
|---|---|---|---|
| 2007/0206548 | A1 | 9/2007 | Toskala et al. |
| 2008/0102749 | A1* | 5/2008 | Becker ............... H04L 12/1877 455/3.06 |
| 2011/0223943 | A1 | 9/2011 | Fischer |
| 2012/0176953 | A1 | 7/2012 | Chao et al. |
| 2012/0208450 | A1 | 8/2012 | Sparks et al. |
| 2014/0286221 | A1 | 9/2014 | Chandramouli et al. |
| 2016/0080163 | A1 | 3/2016 | Taylor |
| 2018/0146362 | A1* | 5/2018 | Hou ........................ H04W 8/08 |

FOREIGN PATENT DOCUMENTS

| | | |
|---|---|---|
| CN | 101356545 A | 1/2009 |
| CN | 101552800 A | 10/2009 |
| CN | 101843120 A | 9/2010 |
| CN | 102138143 A | 7/2011 |
| CN | 105163285 A | 12/2015 |
| WO | 2014133652 A1 | 9/2014 |

OTHER PUBLICATIONS

Brazilian Office Action issued in corresponding Brazilian Patent Application No. BR 1120180701033, dated Jul. 9, 2020, with English translation thereof.

Communication pursuant to Article 94(3) EPC issued in corresponding European Patent Application No. 16 897 330.3 dated May 13, 2020.

Sep. 20, 2019 Extended Search Report issued in European Patent Application No. 16897330.3.

Mitsubishi Electric: "MBMS Architectures for Local and Remote V2X Application Servers", 3GPP Draft; R3-160315—(MBMSARCHFORV2X), 3rd Generation Partnership Project (3GPP), Mobile Competence Centre; 650 Route Des Lucioles; F-06921 Sophia-Antipolis Cedex; France, vol. RAN WG3, No. Anaheim, CA (USA); Nov. 16-20, 2015 Feb. 14, 2016 (Feb. 14, 2016), XP051056177.

Communication pursuant to Article 94(3) EPC issued in corresponding European Patent Application No. 16 897 330.3 dated Oct. 22, 2020.

First Office Action issued in corresponding Chinese Patent Application No. 201680086338.0, dated Jan. 6, 2021, with English summary thereof.

* cited by examiner

… …

APPARATUSES AND METHODS TO SUPPORT LOCAL MULTIMEDIA BROADCAST MULTICAST SERVICE (MBMS) DISTRIBUTION

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-Advanced Pro, LTE-M, and/or 5G radio access technology. In particular, some embodiments may relate to multimedia broadcast multicast service (MBMS) distribution.

Description of the Related Art

Universal Mobile Telecommunications System (UMTS) Terrestrial Radio Access Network (UTRAN) refers to a communications network including base stations or Node Bs, and, for example, radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method, which may include receiving, for example by a broadcast multicast service center (BM-SC), an activate multimedia broadcast multicast service (MBMS) bearer request message to initiate an activate multimedia broadcast multicast service (MBMS) bearer request procedure. The activate MBMS bearer request message may include at least one of information on local MBMS distribution received from a local MBMS entity (LME), or a destination area, or a destination area and an indication that preferred delivery is via local distribution. The method may also include determining whether local distribution path will be used based on at least one of information received in the activate MBMS bearer request message and/or stored information about local MBMS entities.

In an embodiment, the method may further include, when establishment of local delivery path is needed, initiating, for example by a station transmitting the activate MBMS bearer request message, a local distribution request procedure comprising transmitting a local distribution request message to the local MBMS entity (LME). The local distribution request message may include at least one Temporary Mobile Group Identity (TMGI).

According to one embodiment, the method may also include receiving a local distribution response message from the local MBMS entity (LME), the local distribution response message including a list of internet protocol (IP) addresses and/or ports in the local MBMS entity (LME) for receiving data and information on local MBMS distribution. In an example embodiment, the information on local MBMS distribution may comprise at least one of an IP source address and/or IP multicast address in the local MBMS entity (LME) for IP multicast distribution.

In an embodiment, the station may be preconfigured with information on the local MBMS entity (LME), the information including a fully qualified domain name (FQDN) or IP address. According to one embodiment, the method may also include transmitting an activate MBMS bearer response message comprising the information of local multicast distribution.

According to one embodiment, the method may also include sending data to the local MBMS entity (LME) based on the internet protocol (IP) addresses and/or ports received in the local distribution response message from the local MBMS entity (LME). In an embodiment, the method may also include initiating MBMS session start procedure to use the local distribution path.

Another embodiment is directed to an apparatus. The apparatus may include receiving means for receiving an activate multimedia broadcast multicast service (MBMS) bearer request message to initiate an activate MBMS bearer request procedure. The activate MBMS bearer request message may include at least one of information on local MBMS distribution received from a local MBMS entity (LME), or a destination area, or a destination area and an indication that preferred delivery is via local distribution. The apparatus may also include determining means for determining whether local distribution path will be used based on at least one of information received in the activate MBMS bearer request message and/or stored information about local MBMS entities.

In an embodiment, the apparatus may further include, when establishment of local delivery path is needed, initiating means for initiating a local distribution request procedure comprising transmitting a local distribution request message to the local MBMS entity (LME). The local distribution request message may include at least one Temporary Mobile Group Identity (TMGI).

According to one embodiment, the apparatus may include receiving means for receiving a local distribution response message from the local MBMS entity (LME), where the local distribution response message comprises a list of internet protocol (IP) addresses and/or ports in the local MBMS entity (LME) for receiving data and information on local MBMS distribution.

In an embodiment, the information on local MBMS distribution may include at least one of an IP source address and/or IP multicast address in the local MBMS entity (LME) for IP multicast distribution. According to one embodiment, the apparatus may be preconfigured with information on the local MBMS entity (LME), wherein the information comprises a fully qualified domain name (FQDN) or IP address.

According to an embodiment, the apparatus may also include transmitting means for transmitting an activate MBMS bearer response message that comprises the information of local multicast distribution. In one embodiment, the apparatus may also include transmitting means for sending data to the local MBMS entity (LME) based on the internet protocol (IP) addresses and/or ports received in the local distribution response message from the local MBMS entity (LME).

Another embodiment is directed to an apparatus that includes at least one processor and at least one memory including computer program code. The at least one memory and the computer program code are configured, with the at least one processor, to cause the apparatus at least to receive an activate multimedia broadcast multicast service (MBMS) bearer request message to initiate an activate multimedia broadcast multicast service (MBMS) bearer request procedure. The activate MBMS bearer request message may comprise at least one of information on local MBMS distribution received from a local MBMS entity (LME), or a destination area, or a destination area and an indication that preferred delivery is via local distribution. The at least one memory and the computer program code may be further configured, with the at least one processor, to cause the apparatus at least to determine whether local distribution path will be used based on at least one of information received in the activate MBMS bearer request message and/or stored information about local MBMS entities.

Another embodiment is directed to a method, which may include receiving, by a local MBMS entity (LME), a local distribution request message from an intelligent transport system station, wherein the local distribution request message comprises at least one Temporary Mobile Group Identity (TMGI).

In an embodiment, the method may also include sending a local distribution response message to the intelligent transport system station, where the local distribution response message comprises a list of internet protocol (IP) addresses and/or ports in the local MBMS entity (LME) for receiving data and information on local MBMS distribution.

According to one embodiment, the method may also include receiving data from the intelligent transport system station on the internet protocol (IP) addresses and/or ports indicated in the local distribution response message, and forwarding the data to the associated internet protocol (IP) multicast distribution path. The local MBMS entity (LME) may be configured to use IP multicast to distribute the data.

In an embodiment, the method may further include performing at least one of the following functions: SYNC function, IP multicast distribution function, and/or MBMS security function for encrypting a MBMS data packet.

Another embodiment is directed to an apparatus including receiving means for receiving, by a local MBMS entity (LME), a local distribution request message from an intelligent transport system station, wherein the local distribution request message comprises at least one Temporary Mobile Group Identity (TMGI).

In an embodiment, the apparatus may also include sending means for sending a local distribution response message to the intelligent transport system station, where the local distribution response message comprises a list of internet protocol (IP) addresses and/or ports in the local MBMS entity (LME) for receiving data and information on local MBMS distribution.

According to one embodiment, the apparatus may also include receiving means for receiving data from the intelligent transport system station on the internet protocol (IP) addresses and/or ports indicated in the local distribution response message, and forwarding means for forwarding the data to the associated internet protocol (IP) multicast distribution path. The apparatus may be configured to use IP multicast to distribute the data.

In an embodiment, the apparatus may be configured to perform at least one of the following functions: SYNC function, IP multicast distribution function, and/or MBMS security function for encrypting a MBMS data packet.

Another embodiment is directed to an apparatus that includes at least one processor and at least one memory including computer program code. The at least one memory and the computer program code are configured, with the at least one processor, to cause the apparatus at least to receive a local distribution request message from an intelligent transport system station, where the local distribution request message comprises at least one Temporary Mobile Group Identity (TMGI).

BRIEF DESCRIPTION OF THE DRAWINGS

For proper understanding of the invention, reference should be made to the accompanying drawings, wherein.

DETAILED DESCRIPTION

Figure 1:
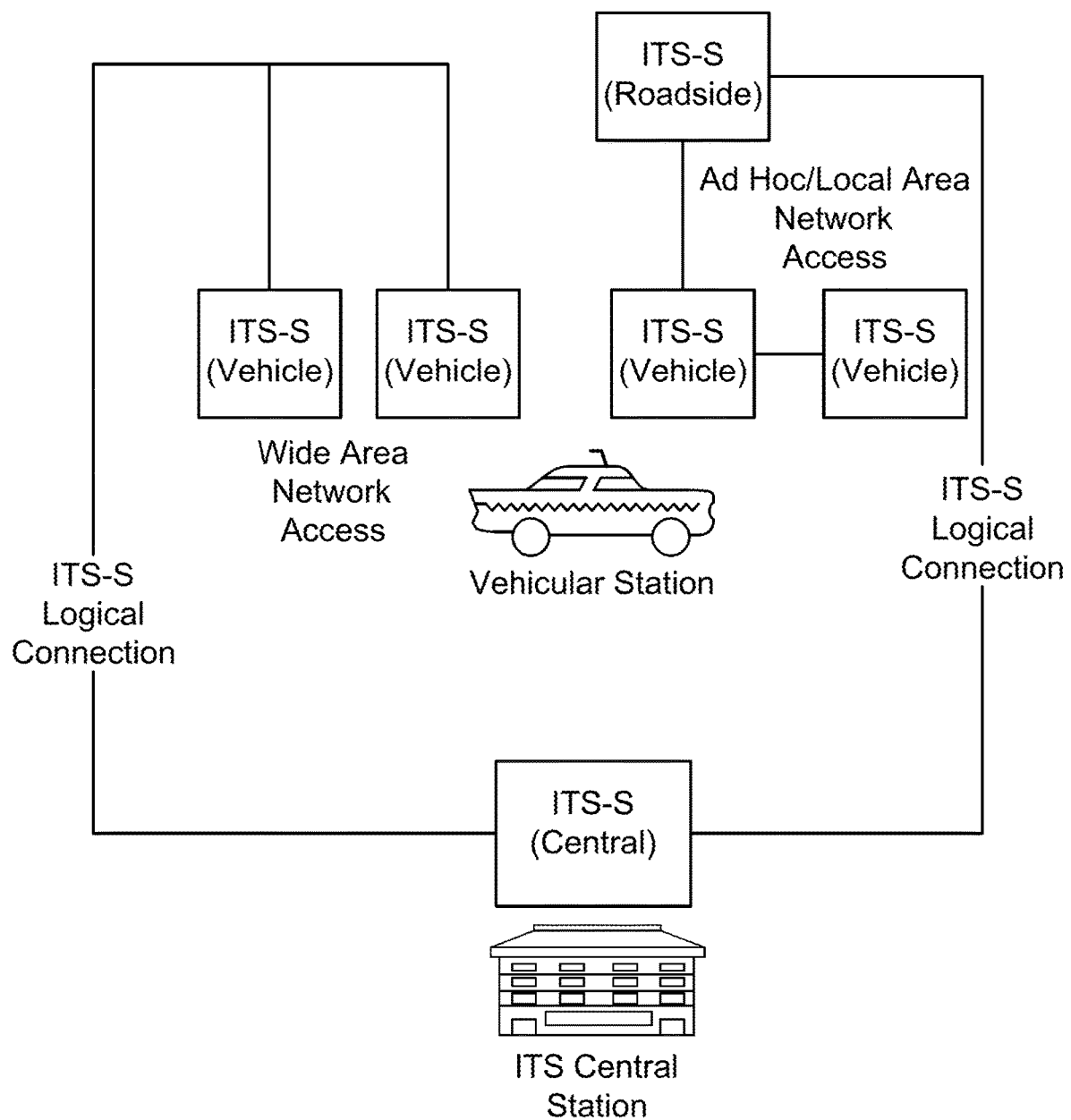
FIG. 1 illustrates an example block diagram of an intelligent transport system (ITS) environment.

It will be readily understood that the components of the invention, as generally described and illustrated in the figures herein, may be arranged and designed in a wide variety of different configurations. Thus, the following detailed description of embodiments of systems, methods, apparatuses, and computer program products for supporting local MBMS distribution, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Multimedia Broadcast Multicast Services (MBMS) is a point-to-multipoint interface specification for 3GPP networks. MBMS is designed to provide efficient delivery of broadcast and multicast services within a cell and within the core network. For broadcast transmission across multiple cells, MBMS may define transmission via single-frequency network configurations.

The MBMS feature is divided into the MBMS bearer service and the MBMS user service, and can be offered over UTRAN or LTE (e.g., eMBMS). The MBMS bearer service includes a multicast and a broadcast mode. The MBMS bearer service uses IP multicast addresses for the IP flows. The MBMS user service is the MBMS service layer and may provide a streaming and a download delivery method. The streaming delivery method can be used for continuous transmissions such as mobile TV services.

Embodiments of the invention introduce a new entity to the MBMS architecture in LTE. In certain examples, this new entity may be referred to as a L MBMS Entity (LME). The LME may reside in the user plane path of the architecture and may provide a short latency local path for user data. In addition, some embodiments provide for re-using the MBMS control plane architecture with minimum enhancements to allow for the establishment of the user plane via LME.

Embodiments of the invention relate to V2X and MBMS. The term V2X refers to vehicular communications, where V refers to a vehicle and X can be another vehicle, the network, infrastructure (e.g., roads, buildings, traffic lights, etc.), or others (e.g., pedestrians, bikes, etc.).

Intelligent Transport Systems (ITS) are systems to support transportation of goods and humans with information and communication technologies in order to efficiently and safely use the transport infrastructure and transport means (e.g., cars, trains, planes, ships). ITS applications are distributed among multiple ITS-stations (ITS-Ss) in order to share information using wireless communications. ITS applications provide a large diversity of customer's services.

FIG. 1 illustrates an example diagram of an ITS environment. As illustrated in FIG. 1, there may be four ITS-station (ITS-S) types. The four ITS-S types may include Central ITS-S, Road side ITS-S, Vehicle ITS-S, and Personal ITS-S. A central ITS-S provides centralized ITS applications. A central ITS-S may play the role of traffic operator, road operator, services provider or content provider. Furthermore, a central ITS-S may require further connection with backend systems via, for example, the Internet. For deployment and performances needs, specific instances of central ITS-S may contain grouping of Applications or Facilities.

A road side ITS-S provides ITS applications from the road side. A road side ITS-S may provide ITS applications independently or cooperatively with central ITS-S or other road side ITS-Ss. For deployment and performances needs, specific instances of road side ITS-S may contain grouping of Applications or Facilities.

A vehicle ITS-S provides ITS applications to vehicle drivers and/or passengers. It may require an interface for accessing in-vehicle data from the in-vehicle network or in vehicle system. For deployment and performances needs, specific instances of vehicle ITS-S may contain grouping of Applications or Facilities.

A personal ITS-S provides ITS applications to personal and nomadic devices. For deployment and performances needs, specific instances of personal ITS-S may contain grouping of Applications or Facilities.

To support ITS, 3GPP SA1#69 agreed to a 3GPP Rel-14 study (S1-150284/SP-150051) on LTE support for V2X services to investigate the essential use cases and requirements for vehicle-to-vehicle (V2V) covering LTE-based communication between vehicles, for vehicle-to-pedestrian (V2P) covering LTE-based communication between a vehicle and a device carried by an individual (e.g., handheld terminal carried by a pedestrian, cyclist, driver or passenger), and vehicle-to-infrastructure/network (V2I/N) covering LTE-based communication between a vehicle and a roadside unit/network. A roadside unit (RSU) is a transportation infrastructure entity (e.g., an entity transmitting speed notifications), which may be implemented in an eNodeB or a stationary UE, for example.

A RSU may support V2I Service and can transmit to, and receive from, a UE (e.g. a vehicle, a handheld terminal) using V2I application. A RSU may be implemented in an eNodeB or a stationary UE. MBMS is considered as a valid delivery method for downlink.

According to 3GPP TS23.203, the Packet Delay Budget (PDB) defines an upper bound for the time that a packet may be delayed between the UE and the Policy Control Enforcement Function (PCEF) (i.e., PGW). The shortest PDB may be 50 ms (QCI 3). Table 1 below depicts the standardized QoS class identifier (QCI) characteristics.

TABLE 1

| QCI | Resource Type | Priority Level | Packet Delay Budget | Packet Error Loss Rate (NOTE 2) | Example Services |
|---|---|---|---|---|---|
| 3 (NOTE 3) | GBR | 3 | 50 ms (NOTE 1, NOTE 11) | $10^{-3}$ | Real Time Gaming |
| 69 (NOTE 3, NOTE 9) | Non-GBR | 0.5 | 60 ms (NOTE 7, NOTE 8) | $10^{-6}$ | Mission Critical delay sensitive signalling, (e.g., MC-PTT signalling) |

Local Breakout for unicast is supported by LIPA and SIPTO@LN. It enables a UE to access a defined IP network (e.g., the Internet) without the user plane traversing the mobile operator's network. However, there is currently no concept of local delivery of MBMS services.

Figure 2:
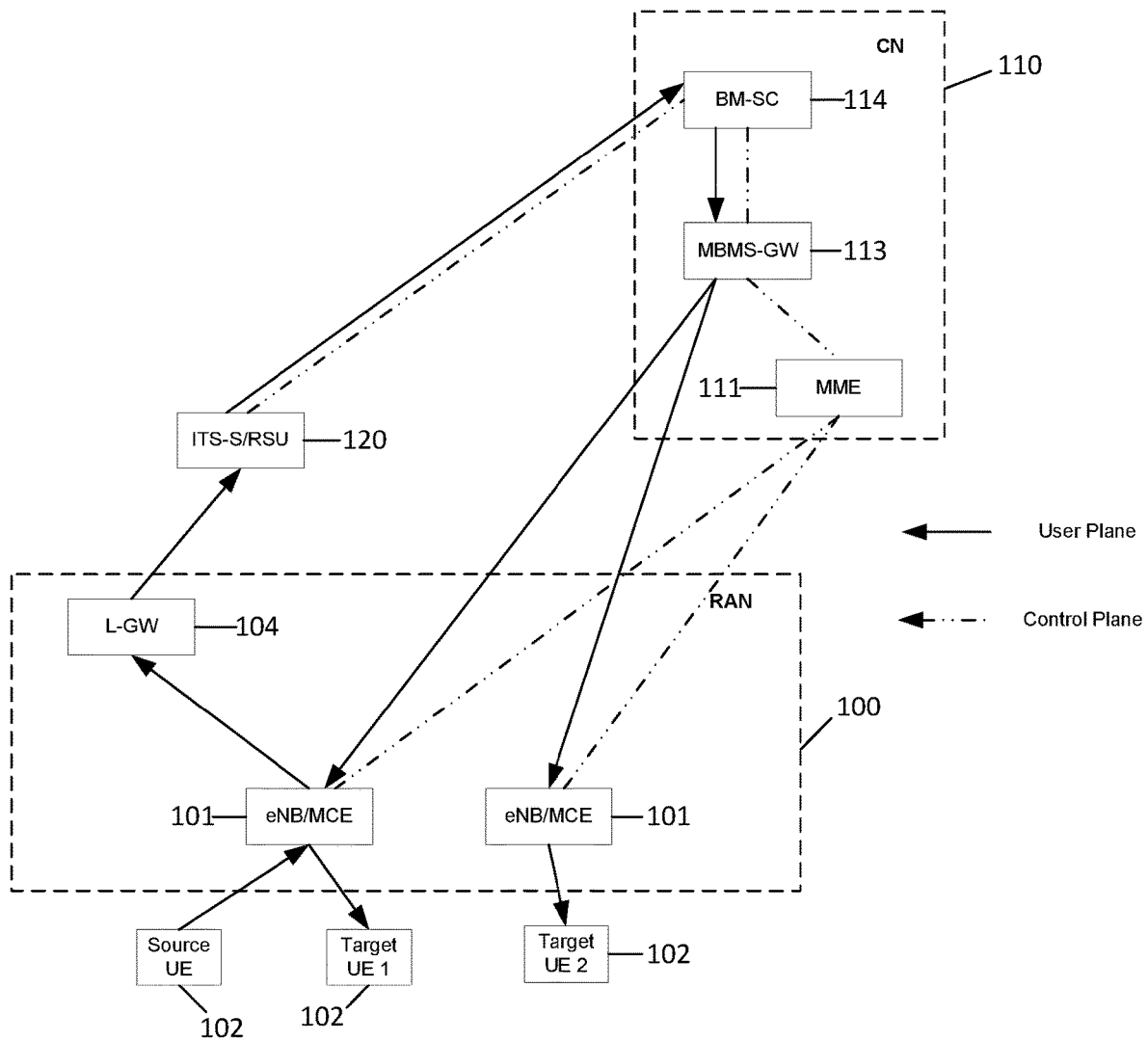
FIG. 2 illustrates an example architecture of V2X data delivery with evolved MBMS (eMBMS)

V2X application requires stringent end-to-end delay requirement. According to 3GPP TR 22.885, most of the use cases require a maximum latency to 100 ms. This is a challenge considering the shortest one-way packet delay budget is 50 ms (QCI 3), and some processing time is required in the ITS server. Even a local ITS server, e.g., where Road Side ITS-S is deployed close to the RAN, the 100 ms latency is still difficult to be achieved. This is mainly due to the fact that the downlink data has to be sent to the Core Network (i.e., broadcast multicast service center (BM-SC), MBMS-GW, MME) in order to use MBMS delivery. FIG. 2 illustrates an example architecture of V2X data delivery with evolved MBMS (eMBMS).

Thus, in order to reduce transmission delay, a method is needed to transmit the downlink data via MBMS with local path, without traversing through the core network.

An embodiment of the invention introduces a new entity to the MBMS architecture in LTE, which may be referred to as a Local MBMS Entity (LME). The LME may reside in the user plane path of the MBMS architecture and may provide a short latency local path for user data. Further, one embodiment includes reusing the eMBMS control plane architecture with minimum enhancements to allow for the establishment of the user plane via the LME.

Figure 3:
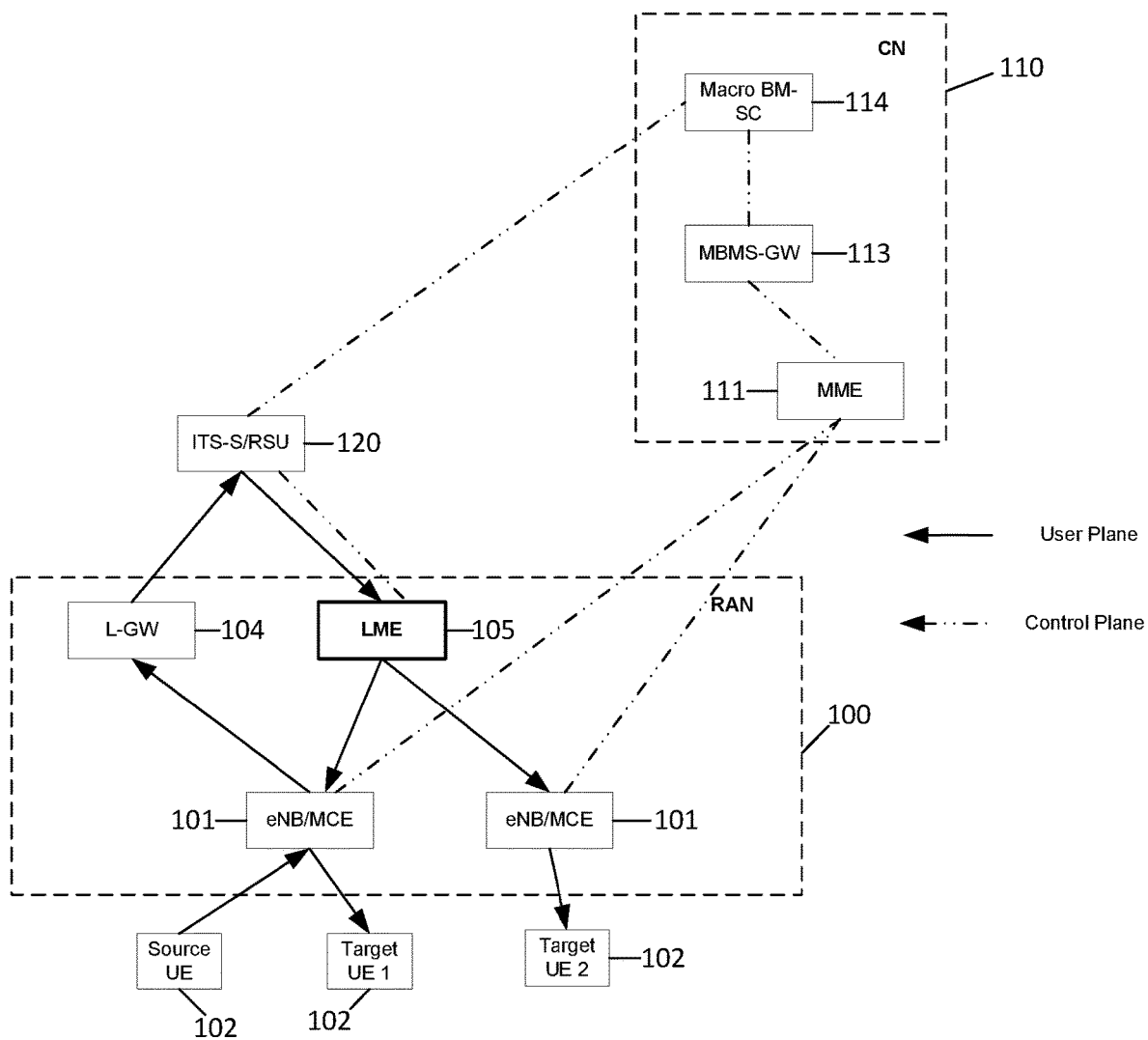
FIG. 3 illustrates an example of a MBMS architecture, according to one embodiment.

FIG. 3 illustrates an example of a MBMS architecture, according to one embodiment. In certain embodiments, the new LME 105 provides the local distribution for MBMS data, while the macro MBMS-service center (MBMS-SC) 114 still hosts the service announcement, bootstrapping, session control, etc. According to one embodiment, the LME 105 only hosts the SYNC function, IP multicast distribution function, and encryption function. This is different from a traditional BM-SC which hosts many functions, such as service announcement, bootstrapping, etc.

According to an embodiment, an application server (e.g., ITS-S/RSU 120) may initiate an activate MBMS bearer procedure including the use of a local MBMS distribution path. In one embodiment, the activate MBMS bearer request message may include the information of the LME, which may be received from the LME 105 via a local distribution request procedure. The information of the LME may include at least a list of the IP address/port in the LME 105 for receiving data, and the associated IP source address/IP multicast address in the LME 105 for IP multicast distribution. Alternatively, in another embodiment, the activate MBMS bearer request message may only include an indication that the application sever prefers to use local MBMS distribution path.

In one embodiment, the BM-SC 114 may select the LME 105, and may reply with information on the IP address/port in the LME for receiving data. According to an embodiment, the BM-SC 114 may be preconfigured with the information of the LME, which includes a list of the IP address/Port in the LME 105 for receiving data, and the associated IP source address/IP multicast address in the LME 105 for IP multicast distribution. The BM-SC 114 may inform the MBMS-gateway (MBMS-GW) 113 about the information of local MBMS distribution. Upon receipt of this information, the MBMS-GW 113 may skip the normal processing for IP Multicast distribution.

According to one embodiment, the application server may send the downlink data to the LME 105, which is then sent to the eNB 101 as MBMS data.

In an embodiment, the local gateway (L-GW) 104 is only for unicast communication on current local IP access (LIPA) or SIPTO@LN. The source UE 102 may use the L-GW 104 to send the data to ITS-S/RSU 120 via the local breakout path. An alternative where the UE 102 sends UL data via the serving gateway or packet data network gateway (S/P-GW) and receives downlink data via the LME is also possible according to an example architecture, although not explicitly shown in FIG. 3. The control plane interface between the ITS-S/RSU 120 and the LME 105 may be used in conjunction with the embodiment described in conjunction with FIG. 4 discussed below.

According to the embodiment depicted in FIG. 3, the LME 105 is a logical entity, which may be deployed closed or in the radio access network (RAN) 100, or be collocated with the ITS-S/RSU, or be collocated with the eNB, with the following functions: SYNC function, IP multicast distribution function, and/or MBMS security function, which encrypts the MBMS data packet.

In an embodiment, the macro BM-SC 114 may host all the functions as defined in 3GPP TS 23.246. The macro BM-SC 114 may perform service announcement for those MBMS services that are offloaded to the LME 105. The ITS-S/RSU 120 may be preconfigured with the IP address of the control plane of the LME 105.

Figure 4:
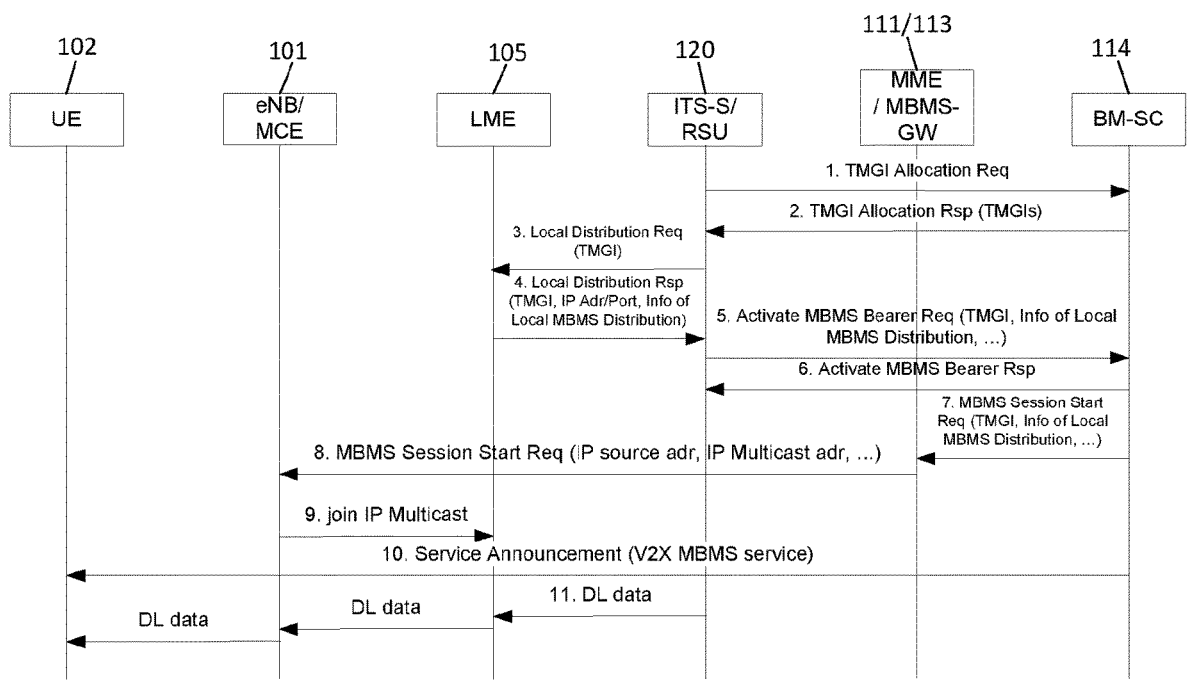
FIG. 4 illustrates a call flow diagram depicting an example of local MBMS distribution establishment, according to one embodiment.

FIG. 4 illustrates a call flow diagram depicting an example of local MBMS distribution establishment, according to one embodiment of the invention. As illustrated in the example of FIG. 4, at 1, the ITS-S/RSU 120 may send a request to the BM-SC 114 to allocate one or more Temporary Mobile Group Identities (TMGIs). Then, at 2, the BM-SC 114 may reply with a list of the TMGI(s). In one embodiment, the ITS-S/RSU 120 may be preconfigured with LME information, such as fully qualified domain name (FQDN) or an IP address for each location. When there is a need to establish delivery path for V2X message, at 3, the ITS-S/RSU 120 may initiate a local distribution request procedure that includes sending a local distribution request message to the LME 105. In an embodiment, the local distribution request message may include the TMGI(s) as an identifier.

According to an embodiment, at 4, the LME 105 may reply with a local distribution response message that includes a list of the IP address(es)/port(s) in the LME 105 for receiving data, and the associated information of local MBMS distribution, such as IP Source Address, and IP Multicast Address in the LME 105 for IP multicast distribution. It is noted that, in LME, it is a 1:1 mapping between the IP address/port for receiving the data, and the associated IP source address/IP Multicast address.

In one embodiment, at 5, the ITS-S/RSU 120 may initiate an activation MBMS bearer request procedure that includes sending an activate MBMS bearer request message to the BM-SC 114. The activate MBMS bearer request message may include the information of local MBMS distribution received from the LME 105. The BM-SC 114 may reply, at 6, with an activate MBMS bearer response message.

Next, at 7, the BM-SC 114 may initiate a MBMS session start procedure that includes sending a MBMS session start request message, which includes the information of local MBMS distribution, to the MME/MBMS-GW 111. Upon the reception of the information of local MBMS distribution, the MBMS-GW 111 may skip the normal processing for IP multicast distribution, e.g., allocate an IP multicast address. The MBMS-GW 111 may use the received local MBMS distribution information in the MBMS session start request message, and send it to the MME, which at 8 is forwarded to eNB/MCE 101. At 9, the eNB may join the IP Multicast group, which is one of the groups in the LME. The BM-SC 114 may initiate a MBMS service announcement at 10.

In an embodiment, at 11, the ITS-S/RSU 120 may send the data to the LME 105 based on the LME's IP address/port received in step 4. Once the LME 105 receive the data in the specific IP address/port, the LME 105 may then forward the data to the associated IP multicast distribution path.

Figure 5:
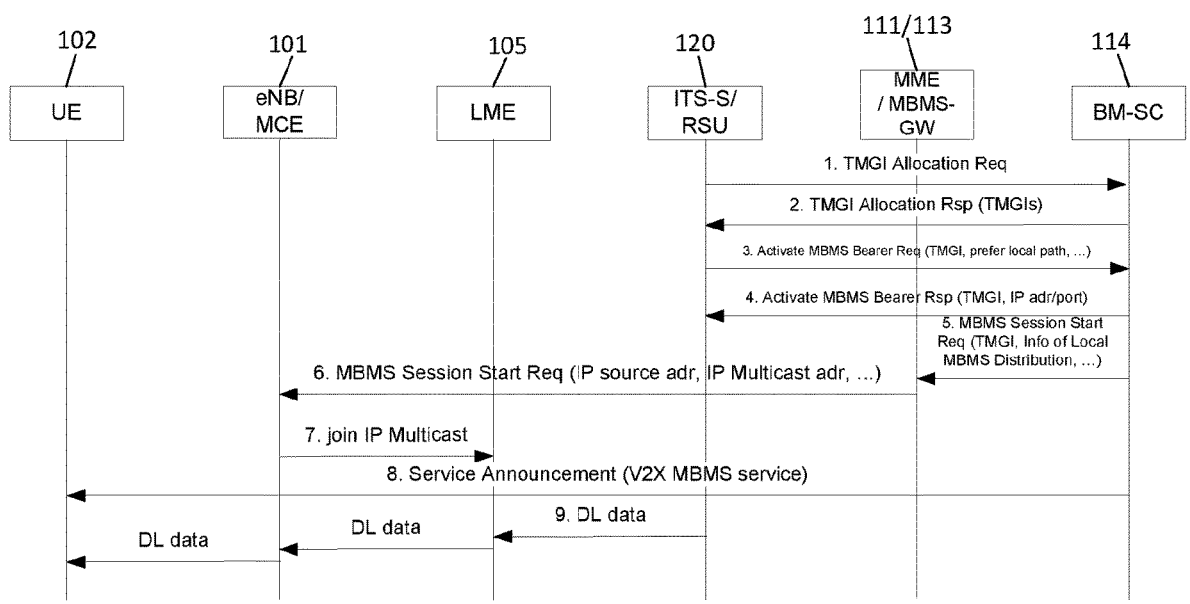
FIG. 5 illustrates a call flow diagram depicting an example of local MBMS distribution establishment, according to another embodiment.

FIG. 5 illustrates a call flow diagram depicting an example of local MBMS distribution establishment, according to another embodiment of the invention. FIG. 5 depicts another implementation example in which the BM-SC 114 is aware of the local distribution path before ITS-S/RSU 120 initiates an activation bearer procedure. In this embodiment, there is no control plane interface between the ITS-S/RSU 120 and the LME 105.

In the example of FIG. 5, at 1, the ITS-S/RSU 120 may request the BM-SC to allocate the TMGI(s). Then, at 2, the BM-SC 114 may reply with a list of TMGI(s). According to an embodiment, when there is a need to establish delivery path for V2X message, at 3, the ITS-S/RSU 120 may initiate an activation MBMS bearer request procedure by sending an activation MBMS bearer request message to the BM-SC 114. The activation MBMS bearer request message may include a destination area and an indication that the preferred delivery is via local distribution. In one embodiment, the activation MBMS bearer request may be an exclusive request, which means that if local distribution is not available for the destination area then the procedure fails.

Continuing with FIG. 5, if the LME 105 is available for the destination area, then the BM-SC 114 may select the LME and the IP multicast distribution path. The BM-SC may reply, at 4, with an activate MBMS bearer response message including the IP address/port in the LME 105 for receiving the data. In one embodiment, the BM-SC 114 may be preconfigured with the information of the LME 105, such as a list of IP address(es)/port(s) to receive data from the application server (e.g., RSU 120), and the associated IP source address/IP Multicast address for IP multicast distribution, served target area, etc. If the BM-SC 114 is not preconfigured with the IP address/port to receive data from the application server, then the BM-SC 114 may request the allocation of the IP address/port from the LME 105.

At 5, the BM-SC 114 may initiate a MBMS session start procedure by sending a MBMS session start request message to MBMS-GW 111. The MBMS session start request message may include the information of local MBMS distribution. Upon the reception of the information of local MBMS distribution, the MBMS-GW 111 may skip the normal processing for IP multicast distribution, e.g., allocate an IP multicast address. The MBMS-GW 111 may use the received local MBMS distribution information in the MBMS session start request message, and send it to the MME, which in turn is forwarded at 6 to the eNB/MCE 101. At 7, the eNB 101 may join the IP multicast group, which is a group in the LME 105. The BM-SC 114 may initiate a MBMS service announcement at 8. The ITS-S/RSU 120 may send the data to the LME 105, at 9, based on the LME's IP address/port received in step 4. Once the LME 105 receive the data in the specific IP address/port, the LME 105 may then forward the data to the associated IP multicast distribution path.

Figure 6A:
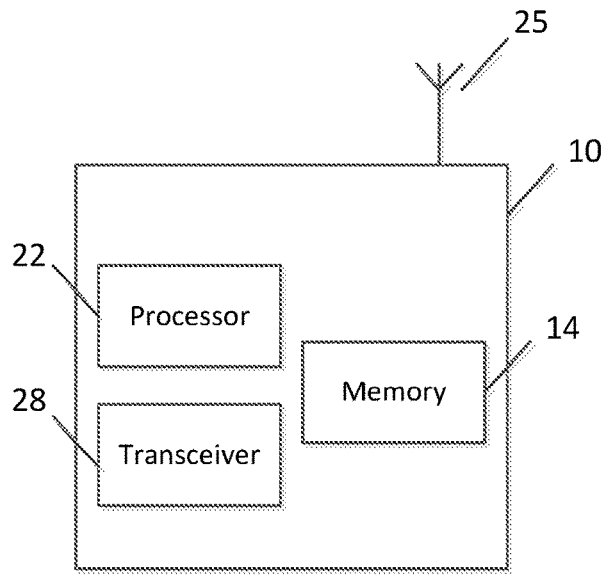
FIG. 6a illustrates a block diagram of an apparatus, according to an embodiment.

FIG. 6*a* illustrates an example of an apparatus 10 according to an embodiment. In an embodiment, apparatus 10 may be a node, host, or server in a communications network or serving such a network. For example, in certain embodiments, apparatus 10 may be an ITS-S/RSU 120 as illustrated in FIGS. 3-5 discussed above. In some embodiments, apparatus 10 may be an application server comprised in an ITS-S or RSU. However, in other embodiments, apparatus 10 may include other entities capable of communicating with a radio access network and/or core network. It should be noted that one of ordinary skill in the art would understand that apparatus 10 may include components or features not shown in FIG. 6*a*.

As illustrated in FIG. 6*a*, apparatus 10 may include a processor 22 for processing information and executing instructions or operations. Processor 22 may be any type of general or specific purpose processor. While a single processor 22 is shown in FIG. 6*a*, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, in one embodiment, apparatus 10 may be an ITS-S or RSU, or an application server included in an ITS-S or RSU, for example. According to certain embodiments, apparatus 10 may be controlled by memory 14 and processor 22 to initiate an activate MBMS bearer request procedure. Apparatus 10 may initiate the activate MBMS bearer request procedure by transmitting an activate MBMS bearer request message to a BM-SC. In one embodiment, the activate MBMS bearer request message may include information on local MBMS distribution received from a LME. Alternatively, in another embodiment, the activate MBMS bearer request message may include a destination area and an indication that preferred delivery is via local distribution. In an embodiment, apparatus 10 may be controlled by memory 14 and processor 22 to receive an activate MBMS bearer response message from the BM-SC.

In an embodiment, apparatus 10 may be controlled by memory 14 and processor 22 to, prior to the initiating of the activate MBMS bearer request procedure, send a request to the BM-SC to allocate at least one TMGI and to receive the at least one TMGI from the broadcast multicast service center (BM-SC). When establishment of delivery path for V2X message is needed, apparatus 10 may be controlled by memory 14 and processor 22 to initiate a local distribution request procedure including transmitting a local distribution request message to the LME. The local distribution request message may include the at least one TMGI as an identifier.

In an embodiment, apparatus 10 may then be controlled by memory 14 and processor 22 to receive a local distribution response message from the LME. The local distribution response message may include a list of IP addresses and/or ports in the LME for receiving data and information on local MBMS distribution. The information on local MBMS distribution may include an IP source address and/or IP multicast address in the LME for IP multicast distribution.

According to certain embodiments, apparatus 10 may be preconfigured with information on the LME, such as a fully qualified domain name (FQDN) or IP address. In an embodiment, apparatus 10 may be controlled by memory 14 and processor 22 to send data to the LME based on the IP addresses and/or ports received in the local distribution response message from the LME.

Figure 6C:
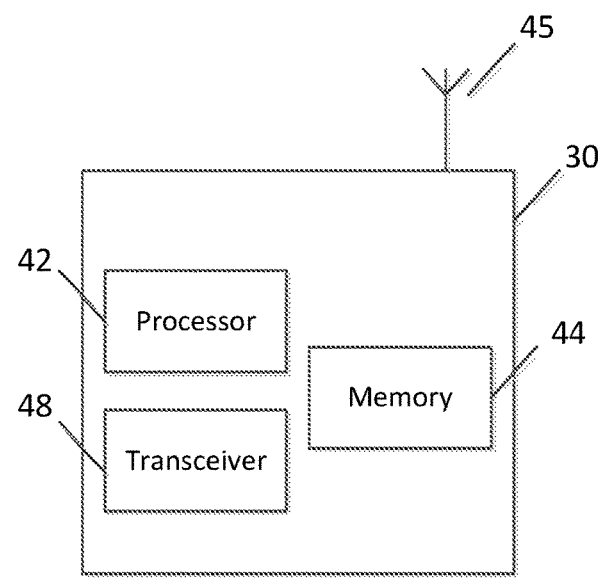
FIG. 6c illustrates a block diagram of an apparatus, according to another embodiment.
Figure 6B:
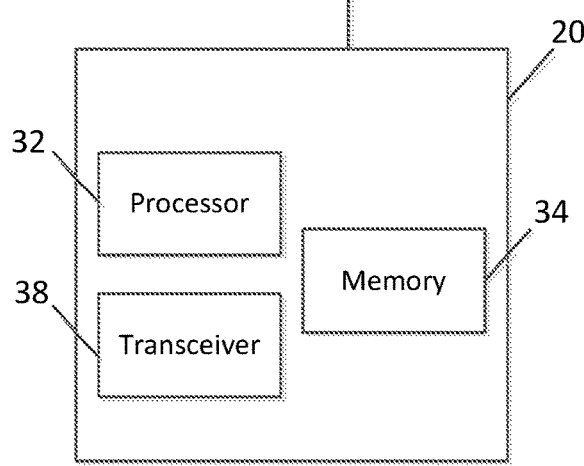
FIG. 6b illustrates a block diagram of an apparatus, according to another embodiment.

FIG. 6b illustrates an example of an apparatus 20 according to another embodiment. In an embodiment, apparatus 20 may be a node, element, or entity in a communications network or associated with such a network. In one embodiment, for example, apparatus 20 may be a LME 105 as illustrated in FIGS. 3-5 discussed above. It should be noted that one of ordinary skill in the art would understand that apparatus 20 may include components or features not explicitly shown in FIG. 6b.

As illustrated in FIG. 6b, apparatus 20 includes a processor 32 for processing information and executing instructions or operations. Processor 32 may be any type of general or specific purpose processor. While a single processor 32 is shown in FIG. 6b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a LME. According to an embodiment, apparatus 20 may be controlled by memory 34 and processor 32 to receive a local distribution request message from an ITS-S or RSU, for example. The local distribution request message may include at least one TMGI as an identifier. In one embodiment, apparatus 20 may then be controlled by memory 34 and processor 32 to send a local distribution response message to the ITS-S/RSU. The local distribution response message may include a list of IP addresses and/or ports in apparatus 20 for receiving data and information on local MBMS distribution.

In certain embodiments, apparatus 20 may be further controlled by memory 34 and processor 32 to receive data from the ITS-S/RSU on the IP addresses and/or ports indicated in the local distribution response message, and to forward the data to the associated IP multicast distribution path. According to one embodiment, apparatus 20 may be controlled by memory 34 and processor 32 to perform at least one of the following functions: SYNC function, IP multicast distribution function, and/or a MBMS security function for encrypting a MBMS data packet.

FIG. 6c illustrates an example of an apparatus 30 according to another embodiment. In an embodiment, apparatus 30 may be a node, element, or entity in a communications network or associated with such a network. In one embodiment, for example, apparatus 30 may be a service center, such as BM-SC 114 illustrated in FIGS. 3-5 discussed above. It should be noted that one of ordinary skill in the art would understand that apparatus 30 may include components or features not explicitly shown in FIG. 6c.

As illustrated in FIG. 6c, apparatus 30 includes a processor 42 for processing information and executing instructions or operations. Processor 42 may be any type of general or specific purpose processor. While a single processor 42 is shown in FIG. 6c, multiple processors may be utilized according to other embodiments. In fact, processor 42 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 30 may further include or be coupled to a memory 44 (internal or external), which may be coupled to processor 42, for storing information and instructions that may be executed by processor 42. Memory 44 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 44 can be comprised of any combination of random access memory (RAM), read only memory (ROM), static storage such as a magnetic or optical disk, or any other type of non-transitory machine or computer readable media. The instructions stored in memory 44 may include program instructions or computer program code that, when executed by processor 42, enable the apparatus 30 to perform tasks as described herein.

In some embodiments, apparatus 30 may also include or be coupled to one or more antennas 45 for transmitting and receiving signals and/or data to and from apparatus 30. Apparatus 30 may further include a transceiver 48 configured to transmit and receive information. For instance, transceiver 48 may be configured to modulate information on to a carrier waveform for transmission by the antenna(s) 45 and demodulate information received via the antenna(s) 45 for further processing by other elements of apparatus 30. In other embodiments, transceiver 48 may be capable of transmitting and receiving signals or data directly.

Processor 42 may perform functions associated with the operation of apparatus 30 including, without limitation, precoding of antenna gain/phase parameters, encoding and decoding of individual bits forming a communication message, formatting of information, and overall control of the apparatus 30, including processes related to management of communication resources.

In an embodiment, memory 44 stores software modules that provide functionality when executed by processor 42. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software.

As mentioned above, according to one embodiment, apparatus 30 may be a BM-SC. According to an embodiment, apparatus 30 may be controlled by memory 44 and processor 42 to receive a TMGI allocation request from an ITS-S/RSU, and to send a TMGI allocation response including at least one TMGI to the ITS-S/RSU. In an embodiment, apparatus 30 may be controlled by memory 44 and processor 42 to receive an activate MBMS bearer request message, from the ITS-S/RSU, to initiate an activate MBMS bearer request procedure. In one embodiment, the activate MBMS bearer request message may include information on local MBMS distribution received from a LME. In another embodiment, the activate MBMS bearer request message may include a destination area, or may include a destination area and an indication that preferred delivery is via local distribution. According to one embodiment, apparatus 30 may be further controlled by memory 44 and processor 42 to determine whether the local distribution path will be used based on information received in the activate MBMS bearer request message, and/or stored information about local MBMS entities. In an embodiment, apparatus 30 may be controlled by memory 44 and processor 42 to send an activate MBMS bearer response message to the ITS-S/RSU.

According to one embodiment, apparatus 30 may be controlled by memory 44 and processor 42 to initiate a MBMS session start procedure by sending a MBMS session start request message to a MME/MBMS-GW. The MBMS session start request message may include the information of local MBMS distribution. Upon reception of the information of local MBMS distribution, the MBMS-GW may skip the normal processing for IP multicast distribution, e.g., allocate an IP multicast address. The MBMS-GW may use the received local MBMS distribution information in the MBMS session start request message, and send it to MME, which in turn is forwarded to eNB/MCE. Apparatus 30 may also be controlled by memory 44 and processor 42 to initiate a MBMS service announcement.

Figure 7A:
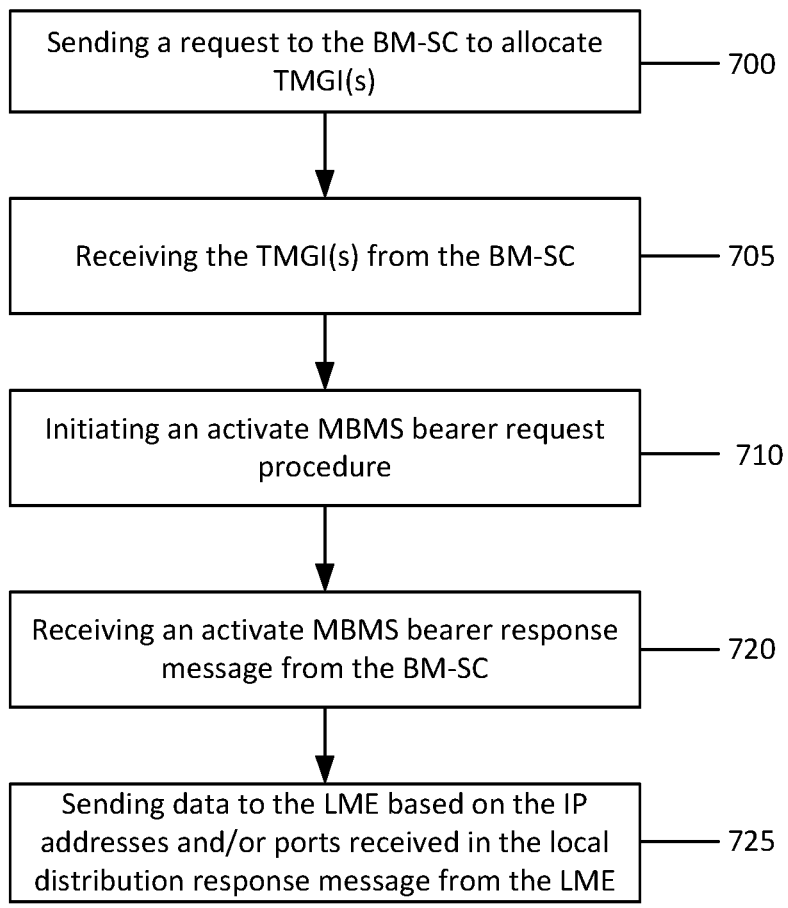
FIG. 7a illustrates a flow diagram of a method, according to an embodiment.

FIG. 7a illustrates an example flow diagram of a method, according to one embodiment. The method of FIG. 7a may be performed by a network node or entity, such as an ITS-S and/or RSU. The method may include, at 700, sending a request to the BM-SC to allocate at least one TMGI and, at 705, receiving the at least one TMGI from the BM-SC. The method may also include, at 710, initiating an activate MBMS bearer request procedure. The initiating of the activate MBMS bearer request procedure may include transmitting an activate MBMS bearer request message to a BM-SC. In one embodiment, the activate MBMS bearer request message may include information on local MBMS distribution received from a LME. Alternatively, in another embodiment, the activate MBMS bearer request message may include a destination area and an indication that preferred delivery is via local distribution. In an embodiment, the method may also include, at 720, receiving an activate MBMS bearer response message from the BM-SC.

In one embodiment, prior to initiating the activate MBMS bearer request procedure, the method may include initiating a local distribution request procedure including transmitting a local distribution request message to the LME. The local distribution request message may include the at least one TMGI as an identifier. In this embodiment, the method may then include receiving a local distribution response message from the LME. The local distribution response message may include a list of IP addresses and/or ports in the LME for receiving data and information on local MBMS distribution. The information on local MBMS distribution may include an IP source address and/or IP multicast address in the LME for IP multicast distribution. According to certain embodiments, the method may further include, at 725, sending data to the LME based on the IP addresses and/or ports received in the local distribution response message from the LME.

Figure 7B:
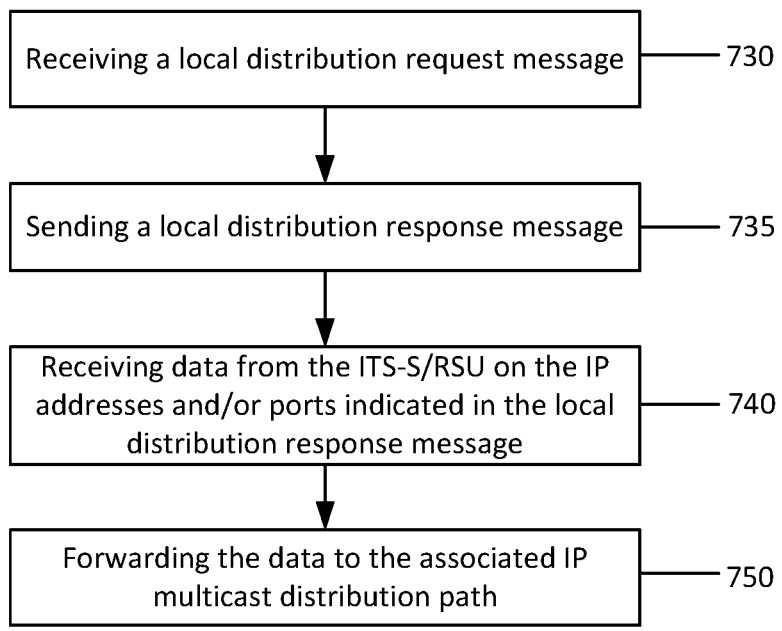
FIG. 7b illustrates a flow diagram of a method, according to another embodiment.

FIG. 7*b* illustrates an example flow diagram of a method, according to one embodiment. The method of FIG. 7*b* may be performed by a node or entity in a radio access network, such as the LME discussed in detail above. The method may include, at 730, receiving a local distribution request message from an ITS-S or RSU, for example. The local distribution request message may include at least one TMGI. The method may then include, at 735, sending a local distribution response message to the ITS-S or RSU. The local distribution response message may include a list of IP addresses and/or ports in the LME for receiving data and information on local MBMS distribution. In an embodiment, the method may further include, at 740, receiving data from the ITS-S/RSU on the IP addresses and/or ports indicated in the local distribution response message, and forwarding the data to the associated IP multicast distribution path at 750. In certain embodiments, the method may also include performing, by the LME, at least one of the following functions: SYNC function, IP multicast distribution function, and/or MBMS security function for encrypting a MBMS data packet.

Figure 7C:
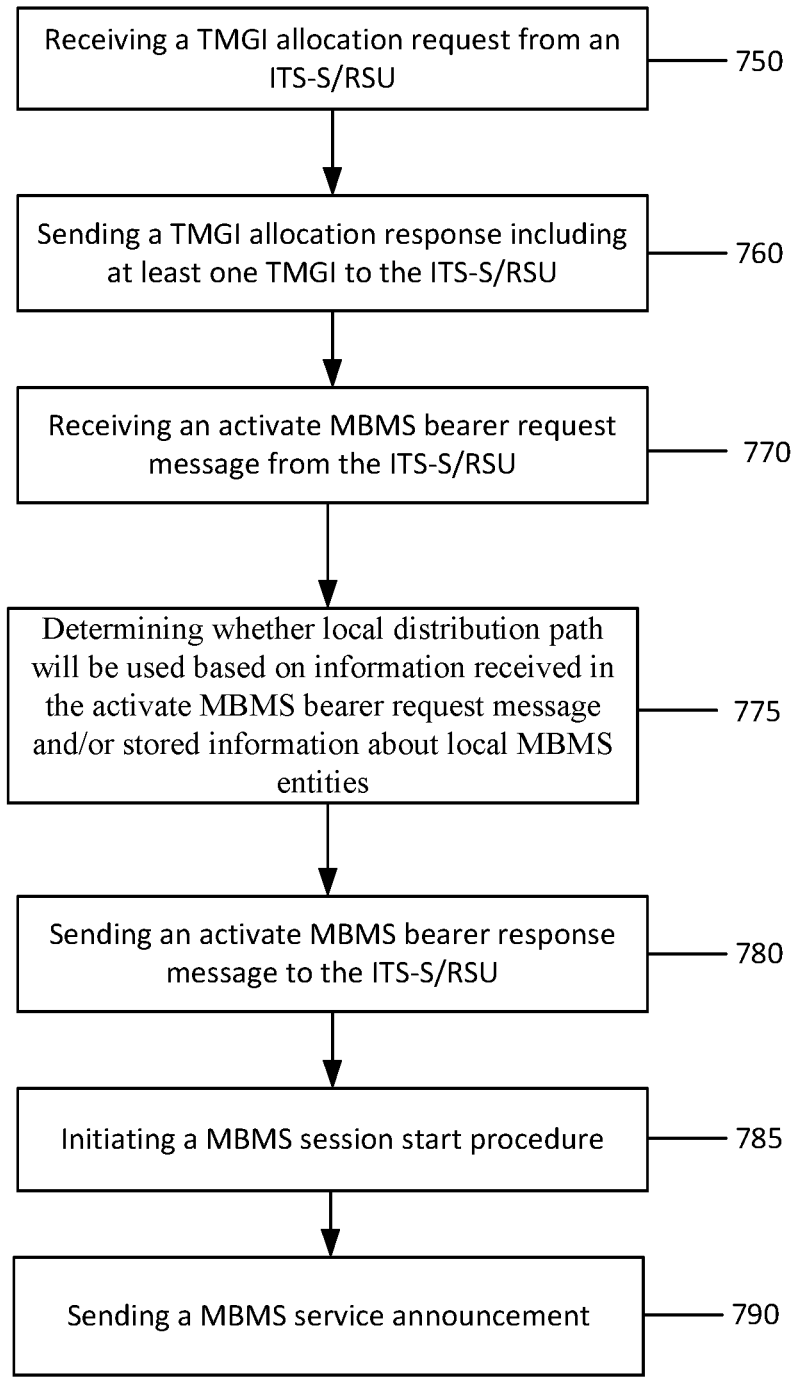
FIG. 7c illustrates a flow diagram of a method, according to an embodiment.

FIG. 7*c* illustrates an example flow diagram of a method, according to one embodiment. The method of FIG. 7*c* may be performed by a node or entity in a core network, such as the BM-SC discussed in detail above. The method may include, at 750, receiving a TMGI allocation request from an ITS-S/RSU, and sending, at 760, a TMGI allocation response including at least one TMGI to the ITS-S/RSU. In an embodiment, the method may further include receiving, at 770, an activate MBMS bearer request message, from the ITS-S/RSU, to initiate an activate MBMS bearer request procedure. In one embodiment, the activate MBMS bearer request message may include information on local MBMS distribution received from a LME. In another embodiment, the activate MBMS bearer request message may include a destination area, or may include a destination area and an indication that preferred delivery is via local distribution. According to one embodiment, the method may also include, at 775, determining whether local distribution path will be used based on information received in the activate MBMS bearer request message and/or stored information about local MBMS entities. In an embodiment, the method may include, at 780, sending an activate MBMS bearer response message to the ITS-S/RSU.

According to one embodiment, the method may also include, at 785, initiating a MBMS session start procedure, for example, by sending a MBMS session start request message to a MME/MBMS-GW. The MBMS session start request message may include the information of local MBMS distribution. Upon reception of the information of local MBMS distribution, the MBMS-GW may skip the normal processing for IP multicast distribution, e.g., allocate an IP multicast address. The MBMS-GW may use the received local MBMS distribution information in the MBMS session start request message, and send it to MME, which in turn is forwarded to eNB/MCE. The method may also include, at 790, sending a MBMS service announcement.

Embodiments of the invention provide several technical improvements and advantages. These technical improvements/advantages include enabling short latency local path for user data whilst the control procedures (service announcement, bootstrapping, user service registration, etc.) are intact and based on the current control plane. In addition, there is no impact to the UE because, similar to the current MBMS system, the UE only knows the macro BM-SC. Further, embodiments are able to minimize the impact to the RAN. The RAN only needs to implement the U-plane of the BM-SC/MBMS-GW, while the C-Plane is in macro CN. This will keep the current principle to use one BM-SC for service announcement, bootstrapping, user service registration, etc. Also, embodiments are similarly able to minimize the impact to the CN. The macro BM-SC/MBMS-GW only needs to know whether local distribution is used.

In some embodiments, the functionality of any of the methods, processes, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, objects, functions, applets and/or macros, may be stored in any apparatus-readable data storage medium and may include program instructions to perform particular tasks.

A computer program product may comprise one or more computer-executable components which, when the program is run, are configured to carry out embodiments of the invention. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, or software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, or a non-tangible means, that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving, by a broadcast multicast service center (BM-SC) belonging to or located inside of a core network from an intelligent transport system station located outside of the core network, an activate multimedia broadcast multicast service (MBMS) bearer request message to initiate an activate multimedia broadcast multicast service (MBMS) bearer request procedure;
wherein the activate MBMS bearer request message comprises at least one of:
information on local MBMS distribution preconfigured in the intelligent transport system station, or
a destination area, or
a destination area and an indication that preferred delivery is via local distribution; and
determining whether local distribution path will be used based on at least one of:
information received in the activate MBMS bearer request message, or
stored information about local MBMS entities, and further comprising:
initiating a MBMS session start procedure to traverse the local distribution path outside of the core network.

2. The method according to claim 1, further comprising receiving a local distribution response message from the local MBMS entity (LME), wherein the local distribution response message comprises a list of internet protocol (IP) addresses and/or ports in the local MBMS entity (LME) for receiving data and information on local MBMS distribution.

3. The method according to claim 2, wherein the information on local MBMS distribution comprises at least one of an IP source address and/or IP multicast address in the local MBMS entity (LME) for IP multicast distribution.

4. The method according to claim 1, further comprising transmitting an activate MBMS bearer response message by the broadcast multicast service center (BM-SC), the activate MBMS bearer response message comprising the information of local multicast distribution.

5. A computer program, embodied on a non-transitory computer readable medium, the computer program configured to control a processor to perform a method according to claim 1.

6. An apparatus, comprising:
at least one processor; and
at least one memory including computer program code;
the at least one memory and the computer program code configured, with the at least one processor, to cause the apparatus at least to
receive from an intelligent transport system station located outside of a core network an activate multimedia broadcast multicast service (MBMS) bearer request message to initiate an activate multimedia broadcast multicast service (MBMS) bearer request procedure;
wherein the activate MBMS bearer request message comprises at least one of:
information on local MBMS distribution preconfigured in the intelligent transport system, or
a destination area, or a destination area and an indication that preferred delivery is via local distribution; and
determine whether local distribution path will be used based on at least one of:
information received in the activate MBMS bearer request message, or
stored information about local MBMS entities, the at least one memory and the computer program code configured, with the at least one processor, to further cause the apparatus at least to
initiate a MBMS session start procedure to traverse the local distribution path outside of the core network,
wherein the apparatus comprises a broadcast multicast service center (BM-SC) belonging to or located inside of the core network.

7. A method, comprising:
initiating, by a station, located outside of a core network, activate multimedia broadcast multicast service (MBMS) bearer request procedure comprising transmitting an activate MBMS bearer request message to a broadcast multicast service center (BM-SC) belonging to or located inside the core network;
wherein the activate MBMS bearer request message comprises at least one of:
information on local MBMS distribution preconfigured in the intelligent transport system station, or
a destination area, or
a destination area and an indication that preferred delivery is via local distribution; and
when establishment of local delivery path is needed, initiating a local distribution request procedure comprising transmitting a local distribution request message to the local MBMS entity (LME), wherein the local distribution request message comprises at least one Temporary Mobile Group Identity (TMGI),
wherein the local distribution path is traversed outside of the core network.

8. The method according to claim 7, wherein the station is preconfigured with information on the local MBMS entity (LME), wherein the information comprises a fully qualified domain name (FQDN) or IP address.

9. The method according to claim 7, further comprising sending data to an IP address and/or port received in a local distribution response message from the local MBMS entity (LME), to use the local distribution.

10. An apparatus, comprising:
at least one processor; and
at least one memory including computer program code;

the at least one memory and the computer program code configured, with the at least
one processor, to cause the apparatus at least to initiate activate multimedia broadcast multicast service (MBMS) bearer request procedure comprising transmitting an activate MBMS bearer request message to a broadcast multicast service center (BM-SC) belonging to or located inside of a core network, wherein the apparatus is located outside of the core network;
wherein the activate MBMS bearer request message comprises at least one of:
information on local MBMS distribution preconfigured in the intelligent transport system station, or
a destination area, or
a destination area and an indication that preferred delivery is via local distribution; and
when establishment of local delivery path is needed, initiate a local distribution request procedure comprising transmitting a local distribution request message to the local MBMS entity (LME), wherein the local distribution request message comprises at least one Temporary Mobile Group Identity (TMGI),
wherein the local distribution path is traversed outside of the core network.

* * * * *